AUTOMATIC TELEPHONIC ALARM SYSTEM

Filed Feb. 28, 1961 2 Sheets-Sheet 1

INVENTOR.
Rolf A. Rostad
BY
Fryer + Tjensvold
Attorneys

INVENTOR.
Rolf A. Rostad
BY
Fryer & Tjensvold
Attorneys

United States Patent Office 3,124,650

Patented Mar. 10, 1964

3,124,650

AUTOMATIC TELEPHONIC ALARM SYSTEM

Rolf A. Rostad, 437 Belvedere St., San Francisco, Calif.

Filed Feb. 28, 1961, Ser. No. 92,215
6 Claims. (Cl. 179—5)

This invention relates to an alarm system which utilizes telephone lines for transmitting an alarm, and more particularly to apparatus for repeatedly dialing a telephone number and transmitting an alarm message when an alarm switch is closed.

It is an object of this invention to employ telephone wires for transmitting the alarm, and thereby obviate the necessity of employing special wires for an alarm system.

It is a further object of this invention to provide for repeated automatic dialing of the receiver telephone once an alarm switch has been closed so that a busy line will not prevent the alarm from being given.

Another object of this invention is to provide an automatic telephonic alarm system in which the receiving telephone is dialed by means of an automatic dialing mechanism which is actuated and driven by a source of power independent of the usual 110 volt A.C. household current.

Still another object of this invention is to provide an automatic telephonic alarm system which is itself monitored by a trouble circuit which will sound a trouble signal in the event of a break in the wires of the telephonic alarm system or in the event the power for the automatic dialing means should fail.

Other objects and advantages of this invention will become apparent from a review of the drawings and the following specification.

In general the automatic telephonic alarm system of this invention provides for transmission of dial pulses through telephone circuits from the transmitting station to the telephone exchange. The exchange system causes the telephone to ring at the receiving station, which may be the fire department, police department or central station of a warning service. The receiving station has a number of incoming lines with conventional automatic switching for changing to another line if the first line of the receiving station is busy.

The alarm system is readily connected to the existing telephone circuit at the transmitting station. The system includes a pulse unit for simulating dialing of a telephone number, a self-contained source of power for actuating the pulse unit, an alarm switch, electromagnetic means actuated upon closing of the alarm switch for causing the source of power to operate the pulse unit, alarm message transmitting means operating in timed relationship with the pulse unit, and means associated with the pulse unit for breaking the telephone circuit at a spaced interval following transmission of the dial pulses and the alarm message to permit the pulse unit automatically to redial the telephone at the receiving station and insure delivery of the alarm message if the initial dialing was ineffective.

A trouble circuit is advantageously inclined to monitor the alarm system. Current normally present in the telephone circuit at the transmitting station is passed through an electromagnet which holds a switch open in the trouble circuit. Thus a break in the telephone circuit which would prevent the alarm system from operating cuts off the current in the electromagnet and causes the switch in the trouble circuit to close. The trouble circuit has a separate source of power and includes a trouble bell which rings when the trouble circuit is closed thereby warning of breaks in the telephonic alarm circuit. A similar normally open switch in the trouble circuit which closes upon failure of the self-contained source of power for the pulse unit causes the trouble bell to ring if the self-contained source of power fails.

Figure 1:
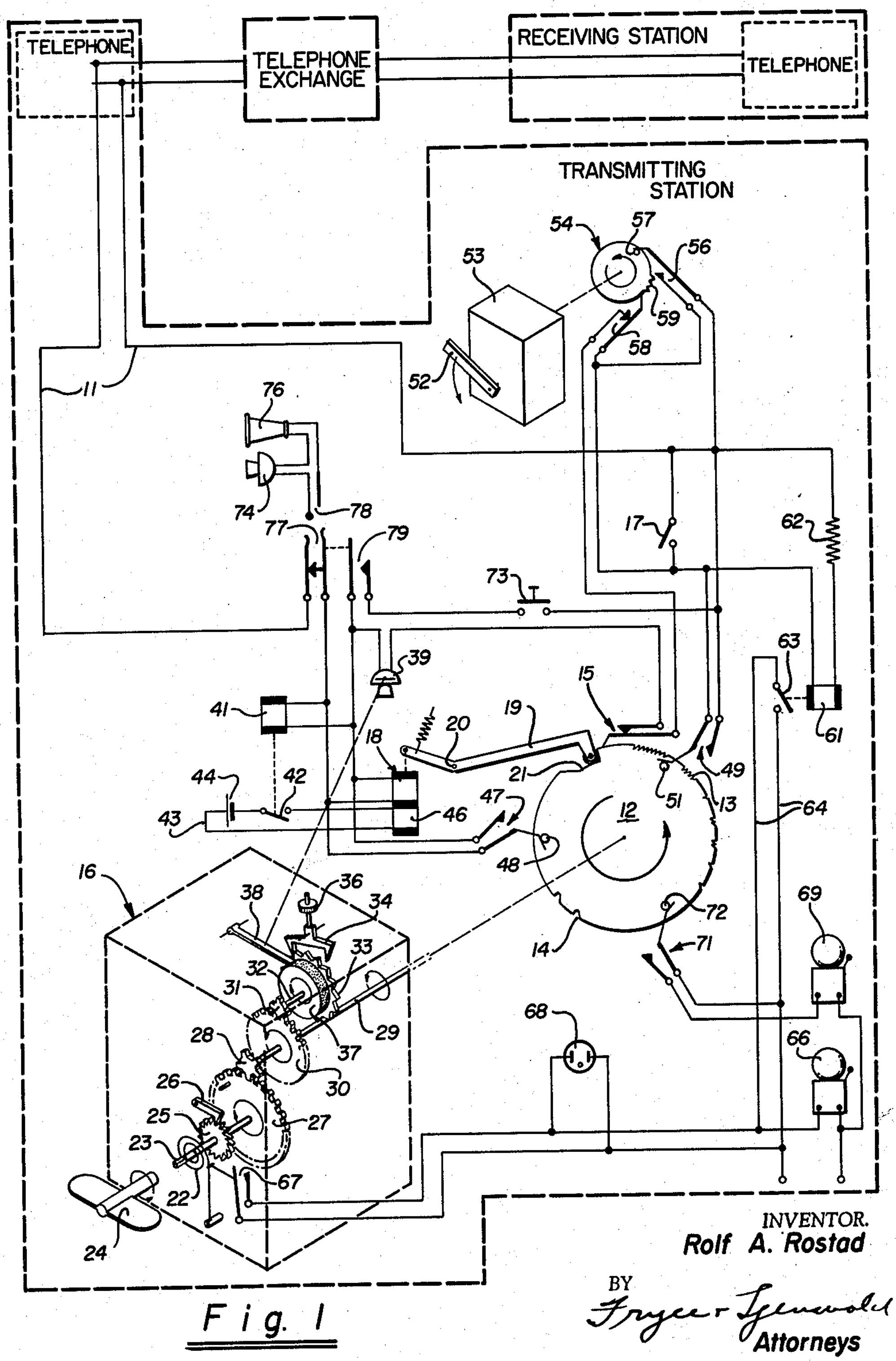
FIG. 1 is a schematic representation of the alarm system, with the self-contained source of power for driving the pulse unit being shown in exploded view.

Referring to FIG. 1, the receiving station telephone, the telephone exchange, and the telephone at the transmitting station are shown schematically in phantom lines. As shown in both FIGS. 1 and 2, the basic elements of the alarm system at the transmitting station include conductors 11 which form an alarm circuit connected to the telephone circuit. Pulses similar to those produced by a telephone dial are produced in conductors 11 by the wheel pulse unit generally indicated as 12. The wheel pulse unit 12 is electrically non-conducting and it contains on its periphery a plurality of pulse-producing dialing notches 13 as well as alarm signal notches 14 which send an alarm message.

Figure 2:
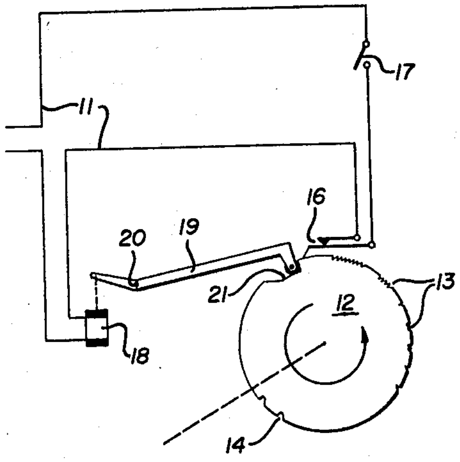
FIG. 2 is a schematic view of the basic elements of the alarm system including a wheel pulse unit, an alarm switch, and an electromagnet for controlling operation of the pulse unit.

When wheel pulse unit 12 rotates in the direction indicated in FIGS. 1 and 2 by the arrow, normally closed pulse switch 15 opens whenever the spring arm of the switch drops into a pulse-producing dialing notch 13 or an alarm signal notch 14. Pulse-producing dialing notches 13 are very narrow, and briefly break the circuit in the same manner as a dial telephone. Seven sets of pulse-producing dialing notches 13 are provided with intervals between each sequence of notches to dial the number of the receiving station.

After wheel pulse unit 12 has rotated past the pulse-producing dialing notches 13 to the point at which spring pulse switch 15 contacts alarm signal notches 14, the spring pulse switch again opens to break the circuit momentarily. Alarm signal notches 14 are wider than the pulse-producing dialing notches 13 and are correlated in width with the peripheral speed of wheel pulse unit 12 to cause distinct clicking signals on the telephone line. However, the alarm signal notches 14 are not of sufficient width to cause the connection to the receiving station to be completely broken. In the usual telephone circuits the relays at the telephone exchange fall and the circuits are broken if the circuits are held open more than one-half second. The number and spacing of the alarm signal notches may be varied so that they will identify the particular transmitting station from which the alarm message is given.

Code wheel pulse unit 12 is rotated by a self-contained source of power generally indicated as 16. The use of a self-contained source of power independent of the 110 volt house current provides an added safeguard which insures that the system will be operable even though the household current is inoperative. Alarm switch 17 in conductors 11 controls the operation of the self-contained source of power 16. This alarm switch 17 may be a thermo switch when the system is employed as an alarm for fires, or an electric eye when the system is used as a burglar alarm.

When alarm switch 17 is closed, the full available current in the telephone system passes through conductors 11, through spring pulse switch 15 and through the windings on electromagnet 18. The current energizes electromagnet 18 which in turn pulls armature 19 down towards the electromagnet. Armature 19 pivots about pin 20 and the hooked end of armature 19 is thus withdrawn from elongated slot 21 in wheel pulse unit 12.

Withdrawal of the hooked end of armature 19 from elongated slot 21 permits the self-contained power unit 16 to rotate wheel pulse unit 12. As previously explained, rotation of wheel pulse unit 12 causes the production of pulses as spring switch 15 passes over pulse-producing notches 13. The space between the position of the arm of spring switch 15 and the first pulse-producing dial notch provides an interval of time between the completion of the alarm circuit and the first pulse-producing dialing notch 13 so that the dial tone will sound before the dial pulses are produced. In addition there is a substantial space along the periphery of wheel pulse unit 12 between the last of the dial-producing notches 13 and beginning of the signal notches 14 to permit time for the telephone at the received station to be answered before the signal notches produce the alarm signal message which indicates the station at which the alarm is being given.

As the wheel pulse unit continues its revolution, the spring pulse switch 15 encounters elongated slot 21. This slot 21 is of sufficient length to cause the telephone circuit to be broken between the transmitting station and the receiving station when the spring arm of switch 15 drops into slot 21, and thus slot 21 permits the receiving station to be redialed. Therefore, it can be seen that elongated slot 21 serves the dual purpose of in effect hanging up the telephone after the receiving station has been dialed and the alarm message has been delivered, and of providing a stop mechanism for receiving the hooked end of armature 19 when switch 17 is open. However, as long as alarm switch 17 remains closed, electromagnet 18 will be energized when the hooked end of armature 19 is adjacent slot 21, dialing of the telephone at the receiving station will be repeated, and the signal produced by alarm signal notches 14 will be given, following which the circuit will again be broken to permit the cycle to be repeated. By means of this arrangement the telephone at the receiving station is repeatedly redialed once alarm switch 17 has been closed so that the alarm will be given even if the telephone at the transmitting station was originally busy when alarm switch 17 was first closed.

As previously described, it is advantageous to drive pulse unit 12 with a source of power which is self-contained. This arrangement provides for operation of the alarm system even if the 110 volt household current is inoperative. Although a battery or other self-contained power unit may be used, a spring driven power unit such as power unit 16 shown in FIG. 1 is a preferred source of power for the pulse unit 12.

Self-contained power unit 16 with its housing shown in phantom lines is driven by spring 22 attached to shaft 23. Key 24 is turned in the direction shown by the arrow adjacent the key to wind up spring 22. Ratchet wheel 25 is fixedly mounted on shaft 23 and revolves with the shaft. Pawl 26 permits the shaft to revolve freely when spring 22 is being wound up, but engages the teeth on ratchet wheel 25 to restrain spring 22 from unwinding before the hooked arm of armature 19 is withdrawn from slot 21 to permit wheel pulse unit 12 to rotate. Gear 27 is rotatably mounted on shaft 23. Since gear 27 is secured to pawl 26, gear 27 will rotate in the direction indicated by the arrow on this gear when spring 22 unwinds and pawl 26 is caused to rotate because of its engagement with ratchet wheel 25.

As gear 27 rotates, its teeth engage the teeth of gear 28 fixedly mounted on an end of drive shaft 29. The other end of drive shaft 29 is secured to and drives wheel pulse unit 12. The rate of revolution of drive shaft 29 is governed by a timing system which includes gear 30 fixedly mounted on shaft 29. When the shaft 29 is driving pulse unit 12, gear 30 rotates in the direction indicated by the arrow on gear 30. Timing gear 31 mounted on shaft 32 is driven by gear 30. As shaft 32 revolves, it causes toothed escapement wheel 33 mounted on shaft 32 to rotate. Anchor escapement arms 34 control the rate at which gear 33 revolves, and thus control the rate of revolution of drive shaft 29. Weight 36 on escapement arms 34 provides a means of adjusting the rate of revolution of gear 33 and consequently of shaft 29. About 2 to 3 revolutions per minute is suitable as the rate of revolution for wheel pulse unit 12, but the rate of revolution which is actually employed depends upon the diameter of wheel pulse unit 12, and spacing of pulse-producing dialing notches 13.

Since the alarm system operates through the telephone circuit at the transmitting station, the circuits must be open to permit transmission of the warning message to the receiving station. Consequently, if the house telephone on the same circuit as the alarm system is in use at the time alarm switch 17 is closed, the dial pulse will be ineffective and the alarm will not be given. In order to warn the user of the transmitting station telephone that the alarm switch has been closed and that he should hang up the telephone to clear the circuits, a warning signal is desirably transmitted over conductors 11.

A simple arrangement for warning users of the transmitting station telephone that the alarm switch has been closed is illustrated in FIG. 1. Abrasive coated wheel 37 is fixedly mounted on shaft 32, and it is contacted by thin metal spring 38. When alarm switch 17 is closed and self-contained power unit 16 causes wheel pulse unit 12 to rotate, abrasive coated wheel 37 rotates and a scratching sound or code is made by the contact of the thin metal spring 38 with the abrasive surface of wheel 37. This scratching sound is readily conveyed over conductors 11 to the house telephone by means of a microphone 39 which is in the alarm circuit, and it provides an unmistakable warning to any user of the telephone at the transmitting station that he should hang up the telephone and clear the circuits.

When the telephone at the transmitting station is on the same circuit as the alarm system, it is advantageous to include a source of auxiliary power to actuate armature 19 when alarm switch 17 has been closed. This extra power is important when the telephone at the transmitting station is being used at the time the alarm switch 17 is closed. When this telephone is in use, it takes a load of about 50 to 100 milliamperes. This load may prevent electromagnet 18 from getting enough current to create sufficient magnetic flux to cause armature 19 to pivot about pin 20 and withdraw the hooked end of armature 19 from slot 21.

As illustrated in FIG. 1, auxiliary power is advantageously provided by a system which includes sensitive relay 41 connected in parallel with electromagnet 18. When alarm switch 17 is closed, the current which flows through conductors 11 is sufficient to energize relay 41 even if the house telephone is in use. Energization of relay 41 closes relay contact 42 and completes a circuit through conductors 43. Battery 44 in conductors 43 causes current to flow through booster windings 46 of electromagnet 18. The current flowing through the booster windings produces sufficient magnetic flux to pull armature 19 out of slot 21 even when the telephone at the transmitting station is in use.

The function of electromagnet 18 and booster windings 46 is to cause the hooked end of armature 19 to be withdrawn from slot 21 when alarm switch 17 is closed. This permits the self-contained power unit 16 to turn wheel pulse unit 12. While wheel pulse unit 12 is turning to give the dialing pulses and alarm message, the hooked end of armature 19 can ride along the periphery of wheel pulse unit 12, and it is not necessary to hold it spaced from wheel pulse unit 12. Consequently, the resistance in the conductors 11 caused by the windings of electromagnet 18 is advantageously eliminated when wheel pulse unit 12 turns in order to reduce the resistance in the circuit caused by electromagnet 18.

This is accomplished by means of spring shunting switch 47 which is held open by pin 48 when the wheel pulse unit 12 is in home position and alarm switch 17 is open. However, when alarm switch 17 is closed and wheel pulse unit 12 commences to revolve, the spring arm of spring switch 47 is released and the switch 47 is closed. Closing of switch 47 shunts out the current going to electromagnet 18, and thus reduces resistance in the telephone circuit when the wheel turns. The hooked end of armature 19 then rides along the edge of wheel pulse unit 12 as the pulse unit rotates. However, when wheel pulse unit 12 completes a revolution so that the hooked end of armature 19 is again adjacent slot 21, pin 48 again causes shunting switch 47 to open. This causes the current in the conductors 11 to pass through electromagnet 18, and armature 19 to rotate about pin 20. By this arrangement electromagnet 18 is operated only momentarily when alarm switch 17 is closed and wheel pulse unit is rotating at the exact time armature 19 is adjacent slot 21.

In addition it is desirable to provide means for insuring that wheel pulse unit 12 will continue to dial and transmit for at least one complete revolution after alarm switch 17 has been closed momentarily and then reopened. This is accomplished by providing spring switch 49 in parallel with alarm switch 17. Spring switch 49 is normally held open by pin 51 on wheel pulse unit 12 when the wheel pulse unit is in home position. However, once alarm switch 17 has been closed even momentarily and wheel 12 has been caused to rotate in the manner previously described, the spring arm of switch 49 is released from pin 51 and the circuit is closed. Since spring switch 49 is in parallel with alarm switch 17, spring switch 49 will keep the circuit through conductors 11 closed even when alarm switch 17 is reopened until wheel pulse unit 12 has completed one revolution and pin 51 again causes switch 49 to open thereby breaking the circuit.

In large buildings which employ the alarm system of this invention it may be desirable to employ auxiliary substations manually or automatically controlled to operate the same wheel pulse unit 12 heretofore described. The substations at the transmitting station may be located on different floors or in a different part of the premises, and are readily incorporated in the alarm circuit in a manner illustrated in FIG. 1. Instead of utilizing an automatic alarm switch such as switch 17 in the basic alarm system hereof, the substation alarm is advantageously operated manually by pulling in the direction of the arrow on lever 52.

Lever 52 is similar to the levers employed in coded fire alarm boxes, and movement of the lever winds up a spring power unit within housing 53. The spring power unit is substantially the same as that shown in greater detail as the self-contained source of power 16. When lever 52 has been pulled downwardly and is then released, the drive shaft of spring power unit 53 causes substation signal wheel 54 to rotate in the direction shown by the arrow. Rotation of substation signal wheel 54 at the substation causes auxiliary spring switch 56 to close as the spring arm of the switch is released from pin 57. Since auxiliary spring switch 56 at the substation is in parallel with alarm switch 17, closing of spring switch 56 has the same effect as closing of alarm switch 17. In order words, closing of spring switch 56 at the substation causes the full current to flow through conductors 11 thereby energizing electromagnet 18 and causing the hooked armature 19 to be withdrawn from slot 21 in wheel pulse unit 12. This withdrawal in turn causes self-contained power unit 16 to rotate pulse unit 12 and thereby cause dialing of the receiving station and transmission of the warning message.

In order to provide an indication as to the substation from which the alarm originates, substation signal code wheel 54 contacts a normally closed sub-signal spring switch 58 which is opened and closed in timed relationship to the signal notches 14 on wheel pulse unit 12 by means of protuberances 59 on signal wheel 54 to cause clicking noises corresponding to the number of protuberances. It should be noted that sub-signal switch 58 will not encounter protuberances 59 until signal wheel 54 has almost completed one full revolution. Since the rate of revolution of signal wheel 54 is adjusted to be the same as the rate of revolution of wheel pulse unit 12, the signals from the substation will be given after the signals from signal notches 14 on the wheel pulse unit 12 have been given. As an alternative, the alarm message from the substation may be a recorded disc of a construction and arrangement similar to that shown and discussed hereafter in FIGS. 4 and 5 for the master wheel pulse unit. It is apparent that a plurality of substations may be connected to the alarm circuit in the same manner as the one in the drawing.

It is very important that a warning be given if conductors 11 are broken, since this would defeat any attempt to send a warning message to the alarm system. A trouble circuit to monitor the alarm system is provided by including a sensitive relay 61 in the alarm circuit, as shown in FIG. 1. Sensitive relay 61 together with limiting resistor 62 are in parallel with alarm switch 17. Therefore, even when alarm switch 17 is open, conductors 11 form a closed circuit with current passing through the circuit. However, limiting resistor 62 only permits a small amount of current to pass through conductors 11, such as five milliamperes or lower. This amount of current is not sufficient to energize electromagnet 18 or actuate relay 41 to cause armature 19 to be withdrawn from recess 21 in wheel pulse unit 12. However, this small amount of current which passes through the system to the conductors 11 is sufficient to energize sensitive relay 61 and maintain relay contact 63 open. However, when there is a break in conductors 11 or series connected equipment so that no current passes through resistor 62 and relay 61, the relay contact 63 of the relay 61 closes to complete a circuit through conductors 64.

Conductors 64 are connected to a source of power, not shown, which is entirely independent of the alarm system, such as 110 volt household current. Therefore when the relay contact 63 of relay 61 closes the circuit in conductor 64, trouble bell 66 which is in this circuit is caused to ring and sound an alarm. Since any break in the conductors 11 and series connected equipment of the alarm system de-energizes relay 61, the trouble bell 66 will warn personnel at the transmitting station that the alarm system is inoperative.

In addition this trouble circuit is advantageously used to monitor the self-contained source of power 16. A spring switch 67 is placed adjacent spring 22 of the self-contained source of power. If for any reason the spring 22 should break and become unwound or partly unwound so that the self-contained source of power may be inoperative, the expansion of spring 22 when it is unwound or broken closes switch 67 in the trouble circuit. Closing of switch 67 also completes the trouble circuit and causes trouble bell 66 to ring indicating that the system is defective.

In order to provide a monitor on the trouble circuit itself to be certain that the trouble circuit is receiving 110 volts A.C., neon light 68 is connected to conductor 64 in the trouble circuit. As long as the neon light 68 is on, it will be apparent that the trouble circuit is receiving its power. However, if the neon light should go out, either the light itself is burnt out or it is not receiving power from the 110 volts in the trouble system, and this warns personnel at the transmitting station to check the source of power in the trouble system.

An alarm bell 69 is also advantageously connected to conductor 64 in the trouble circuit. This alarm bell 69 sounds when normally open spring switch 71 is withdrawn from pin 72 as wheel pulse unit 12 commences to rotate upon closing of alarm switch 17 or auxiliary switch 56 at the substation. When switch 71 is closed it causes alarm bell 69 to ring and thereby indicate to personnel at the transmitting station that an alarm has been sounded.

It should be noted that closing of alarm switch 17 or switch 56 at the substation will in effect short circuit trouble relay 61. Therefore, when these alarm switches are closed, the relay contact 63 of relay 61 will be closed to complete trouble circuit 64. Thus trouble bell 66 sounds as well as alarm bell 69 when an alarm is being transmitted.

In an alarm system which operates automatically, it is desirable to have some means of ascertaining whether or not the system is operable. For this purpose a test circuit has been provided which includes test switch 73 which is normally open. In addition a test telephone speaker 74 and receiver 76 are provided which are normally separated from the alarm system, but which may be plugged in by a telephone plug when the system is to be tested. Jack contact 77 in conductors 11 is normally closed and will open to permit speaker 74 and receiver 76 to be connected in the circuit when plug 78 is plugged in. When speaker 74 and receiver 76 are plugged in, normally open contacts 79 will close and permit closing of normally open push button 73 to start the alarm system operating for testing of the alarm circuit.

In order to test the alarm system, the test telephone including speaker 74 and receiver 76 is plugged in. Since switch 73 is still open, the current in conductors 11 as limited by resistor 62 and sensitive relay 61 continues to pass through electromagnet 18. However, as previously described, this amount of current is insufficient to cause armature 19 to pivot about pin 20. When test switch 73 is closed momentarily, the current shunts out resistor 62 and sensitive relay 61 in the same manner as when alarm switch 17 is closed. This causes the full amount of the current to pass through electromagnet 18, so that the electromagnet combined with its auxiliary power from battery 44 will cause armature 19 to pivot about pin 20. As a result, self-contained source of power 16 rotates wheel pulse unit 12. When test switch 73 is held closed, spring switch 15 for giving the dial pulses and the alarm message signal is bypassed together with microphone 39 over which the scratching noises are transmitted.

In operation the test is commenced by plugging in the test telephone speaker 74 and receiver 76. Next test switch 73 is depressed momentarily thereby causing the wheel pulse unit 12 to commence rotating. Test switch 73 is promptly released to open the test circuit so that spring switch 15 will not be bypassed and so that wheel pulse unit 12 will dial the number of the receiving station. Test switch 73 is then depressed and held closed to bypass pulse switch 15 and microphone 39 so that a conversation may be carried on with the receiving station without interfering noises produced by the dial pulses and the metal spring 38 contacting the abrasive coated wheel 37. This permits the person testing the alarm system to advise the receiving station that it is a test.

Figure 3:
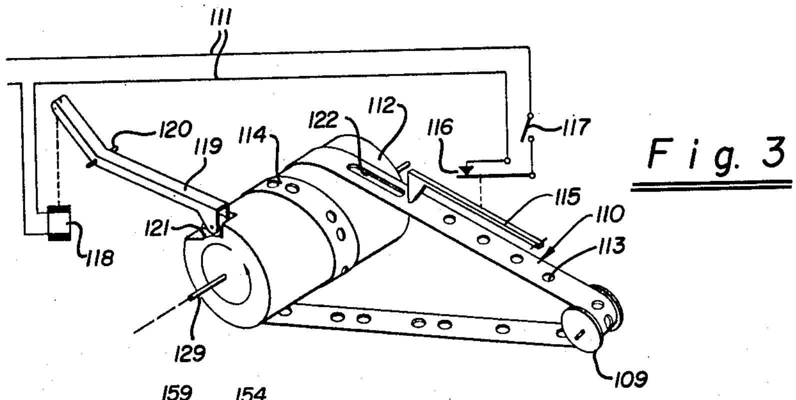
FIG. 3 is a schematic view of a modification of the basic elements of the alarm system shown in FIG. 2, and illustrates a perforated tape pulse unit.

Although wheel pulse unit 12 is a convenient means of transmitting the dial pulses and alarm message, a perforated tape or similar pulse-producing means may be employed in place of the wheel pulse unit. FIG. 3 illustrates a modification of the alarm system pulse unit in which a perforated tape 110 is employed in place of a wheel pulse unit. Conductors 111 are connected to the house telephone circuit. The tape 110 is rotatably mounted on drums 112 and 109 and it sends dial pulses as well as the alarm message through conductors 111 connected to the house telephone circuit.

Dial pulses are produced by perforations 113 and an alarm message is given by perforations 114 which follow the pulse-producing perforations 113 on the tape. As the hooked end of arm 115 falls into the perforations, it breaks the pulse spring contact switch 116 momentarily thereby producing the necessary pulses.

When alarm switch 117 is closed the current energizes electromagnet 118 which in turn pulls armature 119 down towards the electromagnet. Armature 119 pivots about pin 120 and the hook end of armature 119 is thus withdrawn from slot 121 in drum 112.

Withdrawal of the hook end of armature 119 from slot 121 permits the self-contained power unit, not shown, to rotate drive shaft 129 and thus rotate drum 112 in the direction indicated by the arrow in FIG. 3. After the perforated tape has made one complete revolution during which it has dialed the receiving station and given the alarm message, arm 115 falls into elongated perforations 122 thereby opening contact 116 and breaking the connection between the transmitting station and the receiving station. This permits the number of the receiving station to be dialed again in the event the lines were busy at the time the dial pulses commenced. It should be noted that the space between the initial position of the hooked end of arm 115 and the first pulse producing perforations 113 is sufficient to permit the dial tone to commence before the dial pulses are transmitted.

Figures 4, 5:
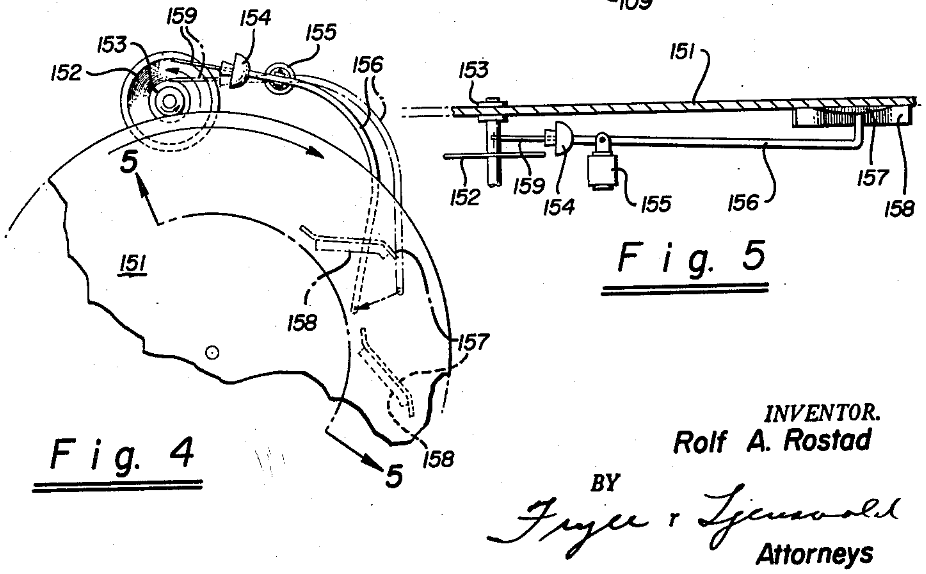
FIG. 4 is a fragmentary view of a portion of a wheel pulse unit cooperating with a modified alarm message transmitting unit.
FIG. 5 is a fragmentary sectional view taken on a line indicated by line 5—5 in FIG. 4.

A very advantageous modification of the alarm message transmitting means in the system of this invention is shown in FIGS. 4 and 5. In this modification, wheel pulse unit 151 similar to wheel pulse unit 12 in FIGS. 1 and 2, drives a recorded disc 152 by means of rubber drive wheel 153. As wheel pulse unit 151 rotates in the direction shown by the arrow, drive wheel 153 in contact with the periphery of the wheel pulse unit also rotates thereby driving disc 152. Carbon microphone 154 picks up the message transcribed on the recorded disc 152 and transmits the warning message over conductors, not shown, connected to the telephone circuit at the transmitting station. Carbon microphone 154 is mounted on horizontal and vertical swivel seat 155 by means of guide swivel arm 156. As wheel pulse unit 151 revolves, the end of guide arm 156 which extends adjacent wheel pulse unit 151 comes in contact with guide 157 mounted on wheel pulse unit 151. Guide 157 combined with beveled seat 158 causes needle arm 159 fastened to the membrane of microphone 154 to be lifted above the surface of the record and be moved to the outer end of the recorded disc 152.

This modified alarm message system shown in FIGS. 4 and 5 is advantageously employed when the receiving station is the fire department or police department. In that case, after the pulse-producing notches have dialed the receiving station, the alarm message will not be in code which must be translated, it will be a spoken message such as "Fire at 111 Jones Street."

In operation the wheel pulse unit 151 commences rotating when the alarm switch is closed. At that time needle arm 159 is in contact with the outer edge of disc 152 and swivel arm 156 is in the position indicated by the solid lines in FIG. 4. At the same time guide 157 and beveled seat 158 are below and just past the hooked end of swivel arm 156 in the direction in which pulse unit 151 revolves. As wheel pulse unit 151 revolves, it drives recorded disc 152 by means of rubber drive wheel 153. The needle arm follows the grooves in disc 152 and transmits the recorded message through microphone 154. Since drive wheel 153 is of a much smaller diameter than wheel pulse unit 151, recorded disc 152 will revolve many times while wheel pulse unit 151 is completing one revolution.

When wheel pulse unit 151 has almost completed one revolution, the needle arm 159 will have moved towards the center of disc 152. The needle arm 159 is returned to its initial position by the action of guide 157 and beveled seat 158 on the hooked end of swivel arm 156. Just before needle arm 159 is returned to the edge of the disc 152, guide 157 and beveled seat 158 are in a position above the hooked end of swivel arm 156 with respect to the direction of rotation of wheel unit 151, as shown in phantom lines in FIG. 4. Guide 157 guides the hooked end of arm 156 inwardly towards the center of unit 151, and this causes the arm 156 to pivot about swivel seat 155 and needle arm 159 to move to the outer edge of recorded disc 152. At the same time in order to prevent the needle from scratching disc 152, swivel arm 156 is pivoted outwardly about horizontal and vertical swivel seat 155 away from the surface of disc 152 by the action of bevel seat 158 on the hooked end of swivel arm 156.

From the foregoing it can be seen that the alarm system hereof is inexpensive, readily connected to existing telephone circuits, and yet provides an almost foolproof alarm system.

I claim:

1. An automatic telephonic alarm system which transmits an alarm over telephone wires from a transmitting station having a telephone circuit to a receiving station having a telephone circuit, which comprises an alarm circuit at the transmitting station connected to the telephone circuit, a normally closed pulse switch in said alarm circuit, a pulse unit having means to briefly and repeatedly open said pulse switch to produce pulses which represent the telephone number of the receiving station, an electromagnet, a normally open automatically operated alarm switch closable to cause said electromagnet to become energized, an armature movable from a hold position preventing operation of said pulse unit to a release position enabling operation of said pulse unit by said energized electromagnet, biasing means urging said armature to its hold position whereby deenergization of said electromagnet results in said armature being conditioned to assume its hold position, a source of power operable upon movement of said armature to its release position by said energized electromagnet to drive said pulse unit and thereby produce pulses which represent the telephone number of the receiving station, and alarm message generating means connected to the alarm circuit and operable by said source of power in timed relationship with producing pulses which represent the number of the receiving station by said pulse unit to transmit the alarm message through said alarm circuit and the telephone wires to the receiving station.

2. An automatic telephonic alarm system which transmits an alarm over telephone wires from a transmitting station having a telephone circuit to a receiving station having a telephone circuit, which comprises an alarm circuit at the transmitting station connected to the telephone circuit, a normally closed pulse switch in said alarm circuit, a pulse unit having means to briefly and repeatedly open said pulse switch to produce pulses which represent the telephone number of the receiving station, an electromagnet, a normally open automatically operated alarm switch closable to cause said electromagnet to become energized, an armature movable by said energized electromagnet, a source of power operable upon movement of said armature by said energized electromagnet to drive said pulse unit and thereby produce pulses which represent the telephone number of the receiving station, alarm message generating means connected to the alarm circuit and operable by said source of power in timed relationship with producing pulses which represent the number of the receiving station by said pulse unit to transmit the alarm message through said alarm circuit and the telephone wires to the receiving station, and means associated with said pulse unit and operable in timed relation to the dialing of said transmitting station by said pulse unit for breaking the alarm circuit for a time sufficient to break the telephone connection between the transmitting station and the receiving station and permit the pulse unit to continuously recycle and thereby redial the transmitting station as long as said alarm switch remains closed.

3. The automatic telephonic alarm system as claimed in claim 1 in which said alarm circuit contains a resistance in said circuit which is in parallel with said alarm switch, a trouble relay in said alarm circuit in series with said resistance, the contact of said trouble relay being normally open when there is current in said alarm system, and a normally open separate trouble circuit closed when the contact of said trouble relay is closed upon failure of the current in said alarm system, said trouble circuit having a trouble bell therein which rings when said circuit is closed to indicate a break in said alarm circuit.

4. The automatic telephonic alarm system as claimed in claim 1 in which said alarm circuit has a substation therein having a normally open manually operable auxiliary switch in parallel with said alarm switch whereby closing of said auxiliary switch energizes said electromagnet and moves said armature to cause said pulse unit to dial the telephone number of the receiving station, a normally closed sub-signal switch which is in series with said pulse switch, a circular signal wheel, a manually operable source of power operably connected to said signal wheel to drive said signal wheel at the same rate of revolution as said pulse unit, said signal wheel having a coded group of protuberances on its periphery operable to break momentarily said normally closed sub-signal switch in timed relationship with respect to transmission of said alarm message to signal the location of said substation.

5. The automatic telephonic alarm system as claimed in claim 1 in which said alarm circuit contains a relay energizable upon closing of said alarm switch wherein a contact of said relay is connected to an auxiliary power circuit including a booster winding on said electromagnet, said auxiliary power circuit being connected to a battery whereby energization of said relay completes said auxiliary power circuit and energizes said electromagnet to move said armature even when the current in said alarm circuit is insufficient to cause said electromagnet to move said armature.

6. An automatic telephonic alarm system which transmits an alarm over telephone wires from a transmitting station having a telephone circuit to a receiving station having a telephone circuit which comprises:

an alarm circuit at the transmitting station connected to the telephone circuit;

a normally closed pulse switch in said alarm circuit;

a pulse unit having means to briefly and repeatedly open said pulse switch to produce pulses which represent the telephone number of the receiving station;

an electromagnet with windings in said alarm circuit;

a normally open automatically operative alarm switch in said alarm circuit closeable to cause said electromagnet to become energized;

an armature movable by said energized electromagnet;

a self-contained source of power comprising a spring wound unit having a helical spring connected to a drive shaft operable upon movement of said armature by said energized electromagnet to drive said pulse unit and thereby produce pulses which represent the telephone number of the receiving station;
a trouble circuit monitoring the tension in said helical spring;
said trouble circuit having a normally open contact switch therein;
a separate source of current for said trouble circuit; and
a trouble bell operatively connected to said trouble circuit;
said contact switch being spaced from said spring so that said contact switch remains open when said helical spring is tightly wound and said contact switch is closed to cause said trouble bell to ring when said spring is unwound.

References Cited in the file of this patent

UNITED STATES PATENTS

| | | |
|---|---|---|
| 967,113 | Dean | Aug. 9, 1910 |
| 2,088,002 | Scott | July 27, 1937 |
| 2,168,320 | Brown | Aug. 8, 1939 |
| 2,555,714 | Talbot | June 5, 1951 |
| 2,827,515 | Zuber | Mar. 18, 1958 |